July 22, 1941.     H. P. SIMMONS     2,250,070
TRACTOR TRANSPORTING VEHICLE
Filed Oct. 29, 1938     3 Sheets-Sheet 1

INVENTOR
H.P.Simmons
ATTORNEY

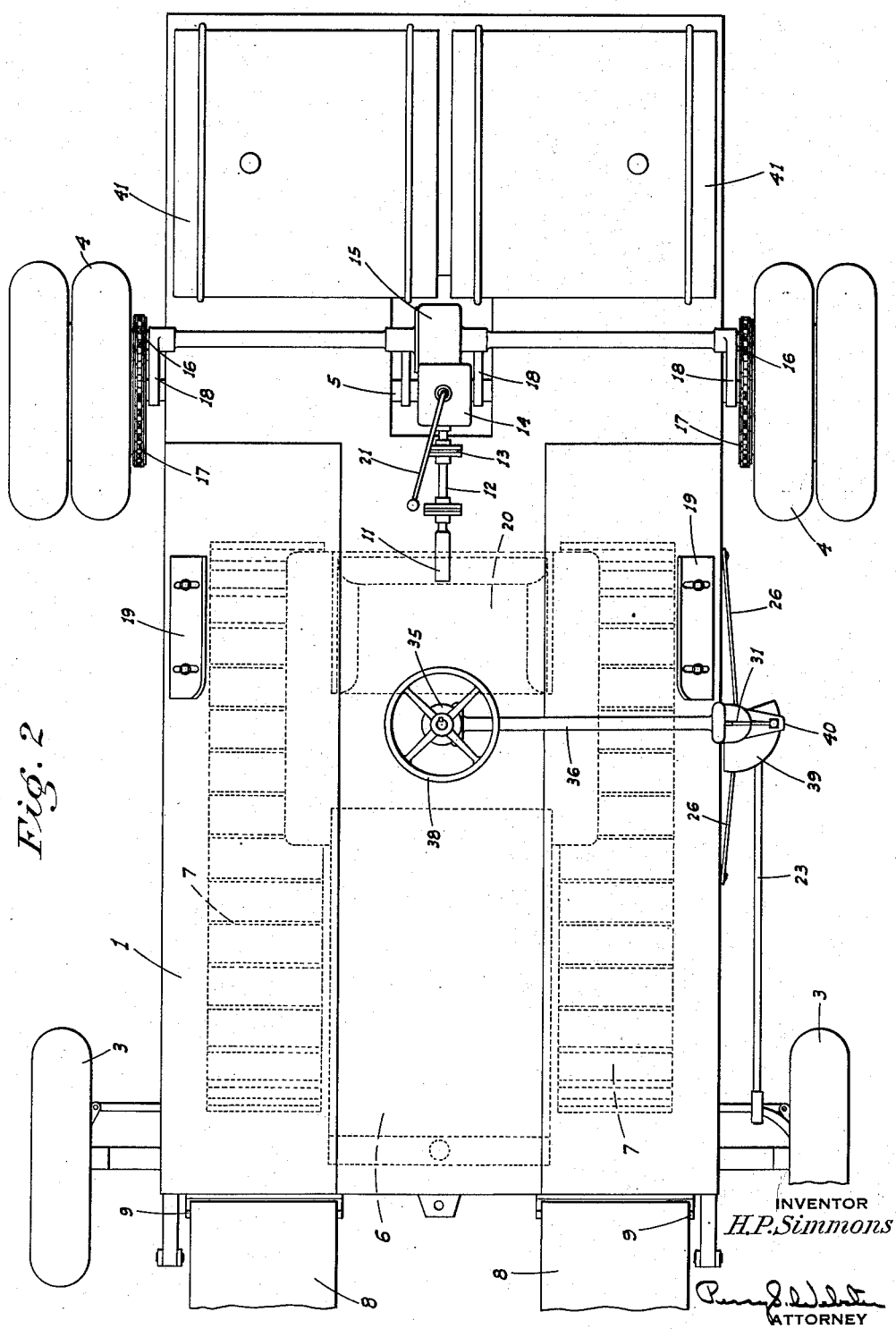

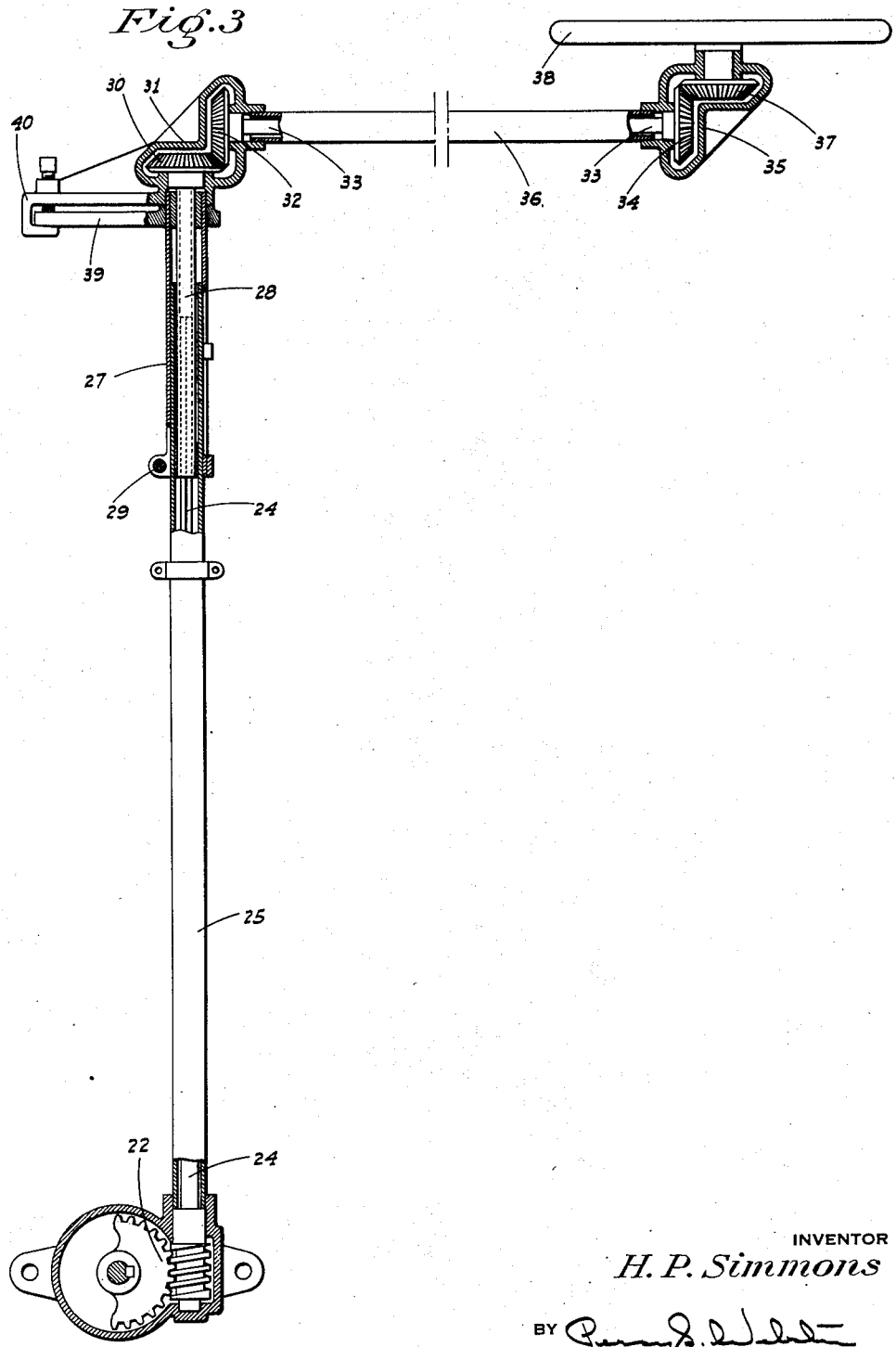

Patented July 22, 1941

2,250,070

UNITED STATES PATENT OFFICE 2,250,070

TRACTOR TRANSPORTING VEHICLE

Henry P. Simmons, Knights Landing, Calif.

Application October 29, 1938, Serial No. 237,670

3 Claims. (Cl. 180—16)

This invention relates to equipment for agriculturists, road contractors and others, who use tractors which at one time or another must cross a highway.

In most places, there are stringent laws against the use of tractors, especially those of the endless track type, on highways, unless the tracks are equipped with street plates to negative the destructive cutting action of the track cleats.

Equipping a tractor with such plates is a slow and arduous procedure, and entails an expenditure of time and labor sometimes out of all proportion to the time the tractor will be on the highway, as for instance when merely crossing, or going along the same for a short distance, as in going from one field to another.

It is therefore the principal object of my invention to avoid the necessity for the use of street plates on a tractor by the provision of a wheeled and rubber tired vehicle of flat bed form onto which the tractor may be driven for transportation along a highway.

In order to avoid the expense of equipping the vehicle with a self-propelling means, or the need of a truck to haul the same, it is another object of my invention to provide a means whereby the tractor itself is used to drive the vehicle, while at the same time enabling the vehicle to have a greater road speed than that of the tractor itself.

The vehicle thus in effect becomes self-propelled, and it is of course necessary to steer the same.

Another important object of my invention therefore is to provide a means for steering the vehicle from the seat on the tractor, so that the one operator can control the movement of the tractor when being transported, as efficiently as when the tractor is on the ground.

In connection with the steering mechanism, it is a further object to arrange the same so that it does not interfere with the movement of the tractor onto or off the vehicle, and a minimum of time is consumed in carrying out either operation.

When not in use for transporting a tractor, the vehicle may be used as a trailer, to carry supplies for the tractor, or any other loads desired, since it has a large carrying capacity.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 2 is a top plan view of the same.

Figure 3 is a sectional elevation, partly foreshortened, of the steering control unit detached.

Figure 1:
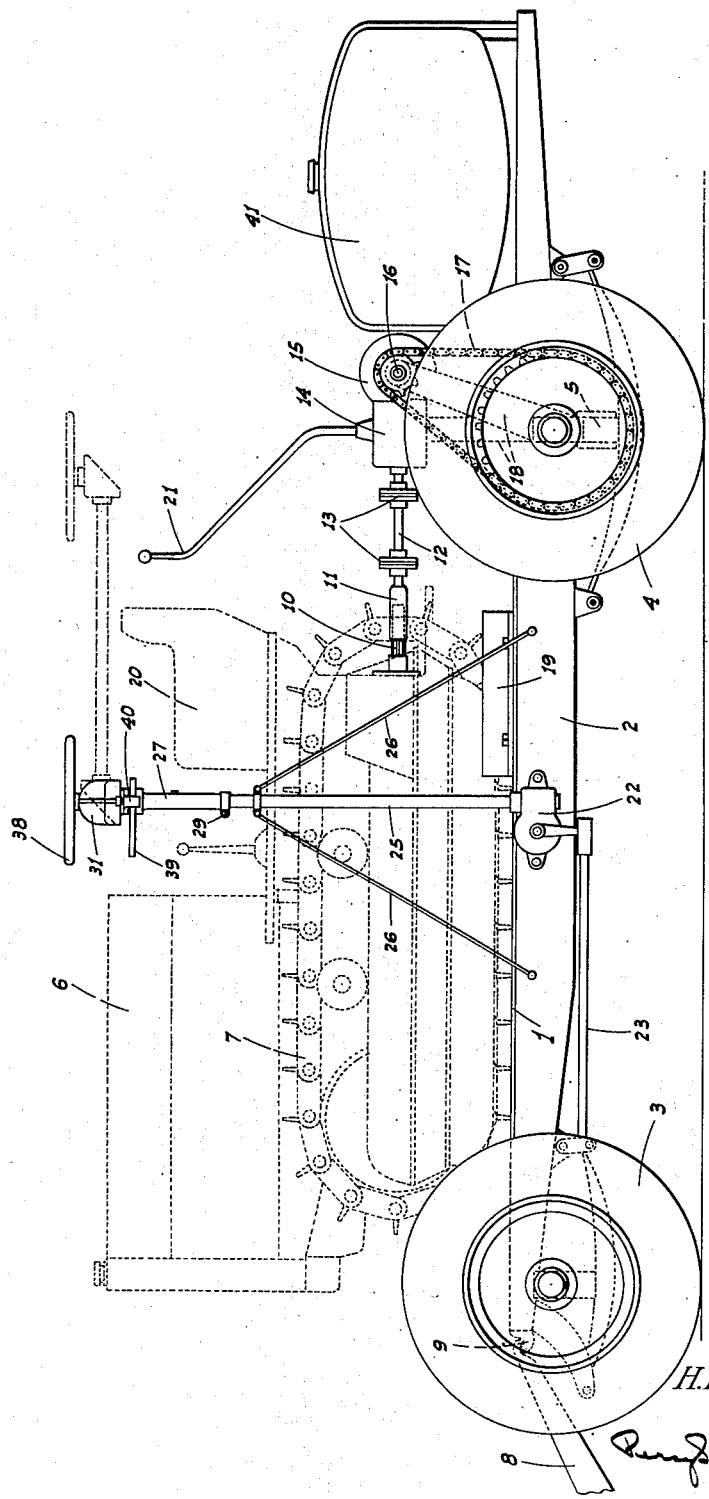
Figure 1 is a side elevation of my improved vehicle, indicating a tractor as being supported thereon.

Referring now more particularly to the characters of reference on the drawings, the vehicle comprises a flat rectangular bed 1 mounted on suitable frames 2 which are supported by front steerable wheels 3 and rear drive wheels 4. The latter are preferably of the dual type, and are independently turnable on a rigid spring mounted axle 5. The width of the bed, and its length from its forward end to a point ahead of the rear wheels, are sufficient to receive a tractor 6 of any size, with its tracks 7 resting on the bed. The vehicle wheels are disposed outwardly of the bed so that the latter may be hung as low as possible while using good sized wheels.

The tractor is intended to be driven onto the vehicle under its own power, runways 8 depending to the ground from the forward end of the bed and removably hung on brackets 9 on the front end of frames 2 being provided to engage the tracks as the tractor moves toward the vehicle. In order to prevent any tendency of the vehicle to tip, the brackets are placed near the vertical plane of the front wheel axle.

In order that the tractor may drive the vehicle, the usual power take-off shaft at the rear of the tractor is provided with a splined extension 10 adapted for slidable driving engagement with a sleeve 11. This sleeve forms part of a drive shaft unit 12 which includes flexible couplings 13 and which is connected to a transmission mechanism of conventional character and mounted in a housing 14 disposed at approximately the level of the power take-off shaft.

The final shaft of this mechanism is connected to a differential mechanism also of conventional form and mounted within a housing 15. Driven shafts 16 project laterally from the differential housing and are connected to the corresponding rear wheels by chain drives 17. The transmission, differential and chain drives are mounted as a rigid unit with the rear axle 5 by suitable brackets 18, any relative vertical movement between the tractor and transmission, due to the spring mounting of the rear axle, being taken up by the flexible drive shaft unit, which also compensates for any slight difference there may be in the level or lateral position of the tractor take-off shaft.

It may here be stated that when backing the tractor onto the vehicle, it is centered as nearly as possible by the operator, such centering being, if so desired, aided by the use of laterally adjustable track guide or gauge plates 19 on the bed when the tractor is fully on the vehicle, the flexible drive shaft unit is held horizontally by another person, and the sleeve 11 is guided into position onto the extension 10 as the tractor reaches its final position on the bed.

The tractor is thus connected in driving relation with the vehicle without any further work being necessary, and the tractor operator from his seat 20 on the tractor controls the driving by means of the operating connections with the power take-off shaft and which are a part of the tractor itself.

The gearing in housings 14 and 15 is arranged so that the vehicle may attain a considerably higher road speed than the tractor itself, selective control of different speeds being effected by the use of a shift lever 21 projecting upwardly from housing 14 to a position behind but convenient to seat 20.

An important feature of this invention is the provision of means to steer the front wheels from the seat 20, regardless of the height of the latter (which depends on the size of the tractor), and without interfering with the movement of the tractor onto or off the vehicle.

This mechanism comprises the conventional worm gearing 22 mounted on one side of the frame of the vehicle between the front and rear wheels and connected in the conventional manner to the adjacent front wheel by the usual steering arm 23. A shaft 24 extends vertically from the worm of gearing 22, being enclosed in a column 25 braced intermediate its ends by guys 26. Another column 27 slidably and non-turnably engages the upper end of column 25 and supports a shaft 28 having sliding but non-turning connection with shaft 24 as shown in Fig. 3. The column 27 is provided with suitable clamping means 29 so that it may be held at any adjusted position on column 25; the shafts inside requiring no holding means as will be obvious.

A bevel gear 30 is mounted on the upper end of shaft 28 which is enclosed in a casing 31 turnable about column 27. Another bevel gear 32 in casing 31 meshes with gear 30 and is connected to one end of a horizontal shaft 33. Another bevel gear 34 is fixed on the opposite end of shaft 33 and is enclosed in a casing 35, the casings 31 and 35 being connected by a shaft enclosing column 36. Another bevel gear 37 in casing 35 meshes with gear 34 and is connected with a substantially horizontal steering wheel 38.

By reason of the above described mechanism, it will be seen that rotation of wheel 38 will effect the steering of the front wheels of the vehicle.

The columns 25 and 27 being relatively slidable, the horizontal column may be temporarily moved to a level such that it will clear the rear of the tractor after the latter is in place on the vehicle, so that the steering wheel may be swung to an operative position overhanging the tractor adjacent seat 20, and be then set at a level convenient to the operator. Swinging of the wheel as above described is of course made possible by the turnable mounting of casing 31 on column 27. Said casing may be clamped in any position by means of a fixed arcuate plate 39 on the upper end of column 27, which is engaged by a clamping unit 40 mounted rigid with said casing. The steering wheel may thus be swung so that it lies adjacent one side of the vheicle, as indicated in Fig. 1, or so that it overhangs the tractor as shown in Fig. 2, where it may be adjusted fore or aft somewhat without materially altering its lateral position, so that it may be located convenient to the tractor driver regardless of the exact position of the seat 20 relative to the fixed vertical column 27.

The vehicle rearwardly of the rear wheels may carry permanently mounted tanks 41 for supplies for the tractor, while the bed when not occupied by a tractor can obviously support a large load of any kind.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A transport vehicle comprising a bed adapted to support a vehicle thereon, pairs of wheels on which the bed is mounted, one pair being steerable, a steering mechanism operatively connected to the steerable wheels and including an upstanding shaft unit supported at one side of the bed, a horizontal shaft extending radially from the upper end of and connected to said shaft unit in driving engagement, a hand wheel on the outer end of the horizontal shaft, a non-rotatable housing about the shaft unit, a support for the horizontal shaft turnable on the upper portion of said housing, a fixed arcuate plate on the housing below and adjacent said support and a cooperating element to clampingly engage said plate mounted in fixed connection with said support.

2. A transporting vehicle for a tractor, said tractor having a power take-off shaft at its rear end with the axis of said shaft extending lengthwise of the tractor; said vehicle comprising a tractor supporting bed, rear drive wheels mounted on the bed, and a drive mechanism for connecting the wheels and said take-off shaft and including a flexible and substantially horizontal shaft unit projecting forwardly from the wheels substantially on a level with said power take-off shaft when the tractor is disposed on the bed in forwardly facing relation and adapted at its forward end to disengageably connect with the take-off shaft in driving relationship therewith and a manually controlled transmission device included with said drive mechanism and operable from the driver's seat of such bed supported tractor.

3. A transport for a vehicle, said vehicle having an exposed shaft adapted to be driven from the vehicle; said transport comprising a vehicle supporting bed, pairs of wheels supporting the bed, and a drive mechanism for connecting one pair of said wheels and the shaft and including a shaft unit adapted at one end for disengageable connection with the vehicle shaft, and a manually controlled transmission device included with said drive mechanism and operable from the driver's seat of such bed supported vehicle.

HENRY P. SIMMONS.